US007797113B2

(12) United States Patent
Yoshida et al.

(10) Patent No.: US 7,797,113 B2
(45) Date of Patent: Sep. 14, 2010

(54) GAS TURBINE PERFORMANCE ANALYSIS METHOD AND GAS TURBINE PERFORMANCE ANALYSIS SYSTEM

(75) Inventors: Takuya Yoshida, Hitachinaka (JP); Toshihiro Morikawa, Naka (JP); Jinichirou Gotou, Mito (JP); Yoshiharu Hayashi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 16 days.

(21) Appl. No.: 12/194,125

(22) Filed: Aug. 19, 2008

(65) Prior Publication Data

US 2009/0055105 A1    Feb. 26, 2009

(30) Foreign Application Priority Data

Aug. 21, 2007    (JP)    ............................. 2007-214932

(51) Int. Cl.
*F02D 45/00*    (2006.01)

(52) U.S. Cl. ......................... 702/33; 702/182; 702/183; 702/184; 702/185; 703/7; 703/8; 700/28; 700/29; 700/30; 700/31; 700/32; 706/20; 706/47; 706/52; 714/25; 714/37; 714/47; 701/3; 701/100; 73/118.1

(58) Field of Classification Search ......... 702/182–185, 702/33; 703/7, 8; 700/28–32; 706/20, 47, 706/52; 714/25, 37, 47, 145; 701/3, 100; 73/118.1

See application file for complete search history.

(56) References Cited

U.S. PATENT DOCUMENTS 7,020,595 B1 *    3/2006    Adibhatla et al. .............. 703/7
2008/0168016 A1    7/2008    Sekiai

FOREIGN PATENT DOCUMENTS

| JP | 2001-174366 | 6/2001 |
| JP | 2006-010229 | 1/2006 |
| JP | 2007-231804 | 9/2007 |
| JP | 2007-264796 | 10/2007 |
| JP | 2007-265212 | 10/2007 |

* cited by examiner

*Primary Examiner*—Sujoy K Kundu
(74) *Attorney, Agent, or Firm*—Brundidge & Stanger, P.C.

(57) ABSTRACT

A gas turbine performance analysis system includes a performance computation module for receiving an actual measured value of an inlet air temperature introduced to a compressor, a compressor pressure ratio, and a flow rate of fuel supplied to the gas turbine, and for calculating and outputting values of the gas turbine's power output and exhaust temperature based on these actual measured values. A performance estimation module evaluates the performance of the gas turbine based on the deviation between the values of power output and exhaust temperature outputted from the performance computation module and the actual measured values of power output and exhaust temperature. An adjustment module calculates a corrected value of the fuel flow rate based on the actual measured values of inlet air temperature, compressor pressure ratio and fuel flow rate, and inputs the corrected fuel flow rate value into the performance computation module.

3 Claims, 8 Drawing Sheets

GAS TURBINE PERFORMANCE ANALYSIS METHOD AND GAS TURBINE PERFORMANCE ANALYSIS SYSTEM

CLAIM OF PRIORITY

The present application claims priority from Japanese patent application JP 2007-214932 filed on Aug. 21, 2007, the content of which is hereby incorporated by reference into this application.

BACKGROUND OF THE INVENTION

1. Field of the Invention

The present invention relates to a gas turbine performance analysis method and a gas turbine performance analysis system.

2. Description of Related Art

Gas turbine performance significantly changes due to not only operating conditions such as fuel flow rate but also atmospheric conditions such as inlet air temperature, it cannot be simply evaluated by using only absolute values. To solve this problem, there is a general method wherein the operating conditions of actual gas turbine are inputted into a performance calculation program of the gas turbine, and computed performance values, that is, proper predicted values are compared with actual measured values to conduct an evaluation of the gas turbine performance.

Actually, since the computed values obtained by the gas turbine performance calculation program never completely matches the actual measured values, to eliminate deviation, some adjustment is made to the computation method. This is generally called "tuning" or "model adjusting." For example, Patent Document 1 has proposed a method wherein specifications of a model are adjusted so that the computed value of the performance model matches the actual measured value, and the computed value is compared with the measured value based on the adjustment results, thereby analyzing the presence or absence of deviation.

Patent Document 1: Japanese Patent Application Laid-Open No. 2001-174366

SUMMARY OF THE INVENTION

However, conventional adjustment methods including Patent Document 1 have problems in that they tend to be complicated, as described below, require a large amount of analysis, so taking enormous time and labor. For example, with regard to a certain measurement item, let specifications of an item related to the gas turbine facility be adjusted so that the actual measured value matches the computed value. In this case, with regard to the target measurement item, the computed value matches the actual measured value, however, due to the cause-effect relationships of phenomena occurring inside the gas turbine, the computed value of other measurement items also changes and does not match the actual measured value in some cases. To avoid such ramifications, it is necessary to adjust another item's specifications. However, this adjustment may cause computed values of another measurement items to be changed, and there is a possibility that the computed value may not match the actual measured value. It is not clarified yet how to deal with the successive adjustments of specifications and which criteria are the best to cut down less influential items for putting an end to a barrage of adjustments.

Therefore, to cope with the situations, it is necessary to closely examine the complicated cause-effect relationships among actual phenomena and their influential range, properly understand such overall complicated relationships as which items of specifications is to be adjusted with which measured value it can deviate and as other measured values are to be affected to what degree the adjustment is made, and determine appropriate adjusting procedures. To do so, a large amount of complicated preliminary analysis, time and labor are required.

It is an object of the present invention to provide a gas turbine performance analysis method and a gas turbine performance analysis system which can accurately analyze gas turbine performance by adjusting a small amount of factors without executing complicated procedures.

A gas turbine performance analysis system according to the present invention comprising: a performance computation module for receiving each of actual measured values of an inlet air temperature introduced to compressor, a compressor pressure ratio and a fuel flow rate supplied to a gas turbine in the actual gas turbine and calculating and outputting values of a gas turbine's power output and exhaust temperature exhausted from the gas turbine based on these actual measured values; and a performance estimation module for evaluating performance of the gas turbine based on the deviation between the values of power output and exhaust temperature outputted from the performance computation module and the actual measured values of power output and exhaust temperature; wherein the gas turbine performance analysis system further comprising:

an adjustment module for calculating a corrected value of the fuel flow rate based on the actual measured values of inlet air temperature, compressor pressure ratio and fuel flow rate, and inputting the corrected fuel flow rate value into the performance computation module.

Furthermore, in a gas turbine performance analysis method according to the present invention comprising steps of: inputting each of measured values of an inlet air temperature introduced to compressor, a compressor pressure ratio and a fuel flow rate supplied to a gas turbine in the actual gas turbine into a gas turbine performance computation process, calculating values of a gas turbine's power output and exhaust temperature exhausted from the gas turbine based on these actual measured values in the gas turbine performance computation process, and evaluating performance of the gas turbine in a performance estimation process based on the deviation between the computed values of power output and exhaust temperature and the actual measured values of power output and exhaust temperature; wherein the gas turbine performance analysis method further comprising steps of:

calculating a corrected value of fuel flow rate in an adjustment process based on actual measured values of inlet air temperature, compressor pressure ratio, and fuel flow rate according to a predetermined functional relation, and inputting the corrected fuel flow rate value into the performance computation process for evaluating performance of the gas turbine.

A gas turbine performance analysis system according to the present invention can have an arithmetic module (hereafter, referred to as an adjustment function setting module) which sets a functional relation of the adjustment module so that the deviation of values of power output and exhaust temperature, which were calculated by inputting time-series data of a certain time period about the actual measured values of inlet air temperature, compressor pressure ratio and fuel flow rate or data about a plurality of operating conditions (hereafter, referred to as a plurality of data sets), and the actual measured values is within the predetermined allowable criteria.

The adjustment module executes a correction calculation of a fuel flow rate based on the actual measured values of inlet air temperature, compressor pressure ratio and fuel flow rate according to the predetermined functional relation, replaces the fuel flow rate value measured in the actual equipment with the corrected fuel flow rate value, and inputs the corrected fuel flow rate value into the performance computation module.

According to the present invention, it is possible to accurately analyze gas turbine performance by adjusting only a few factors without executing complicated procedures. According to the present invention, various factors related to the deviation between the actual measured value and the computed value of the performance can be efficiently and simply adjusted in a comprehensive manner by correcting the data of only one item using input information of three items without executing complicated procedures that use a large amount of information. Furthermore, the information necessary for the correction is measurement data of only five items.

DETAILED DESCRIPTION OF THE PREFERRED EMBODIMENTS

Best Mode for Carrying Out the Invention

In the gas turbine performance calculation, we analyzed factors that cause deviations between the computed value and the actual measured value, and we noted measured deviations in energy input and output balance as one of dominating factors. We then analyzed factors that influence the imbalance and found significantly influential factors. Based on this, we established a model adjustment means for eliminating an error caused by energy imbalance and accordingly we created the present invention. Hereafter, the present invention will be described in detail.

(Analysis of Conventional Methods and Creation of a Model)

To compare with the present invention, first, a conventional gas turbine performance analysis system will be described.

Figure 6:
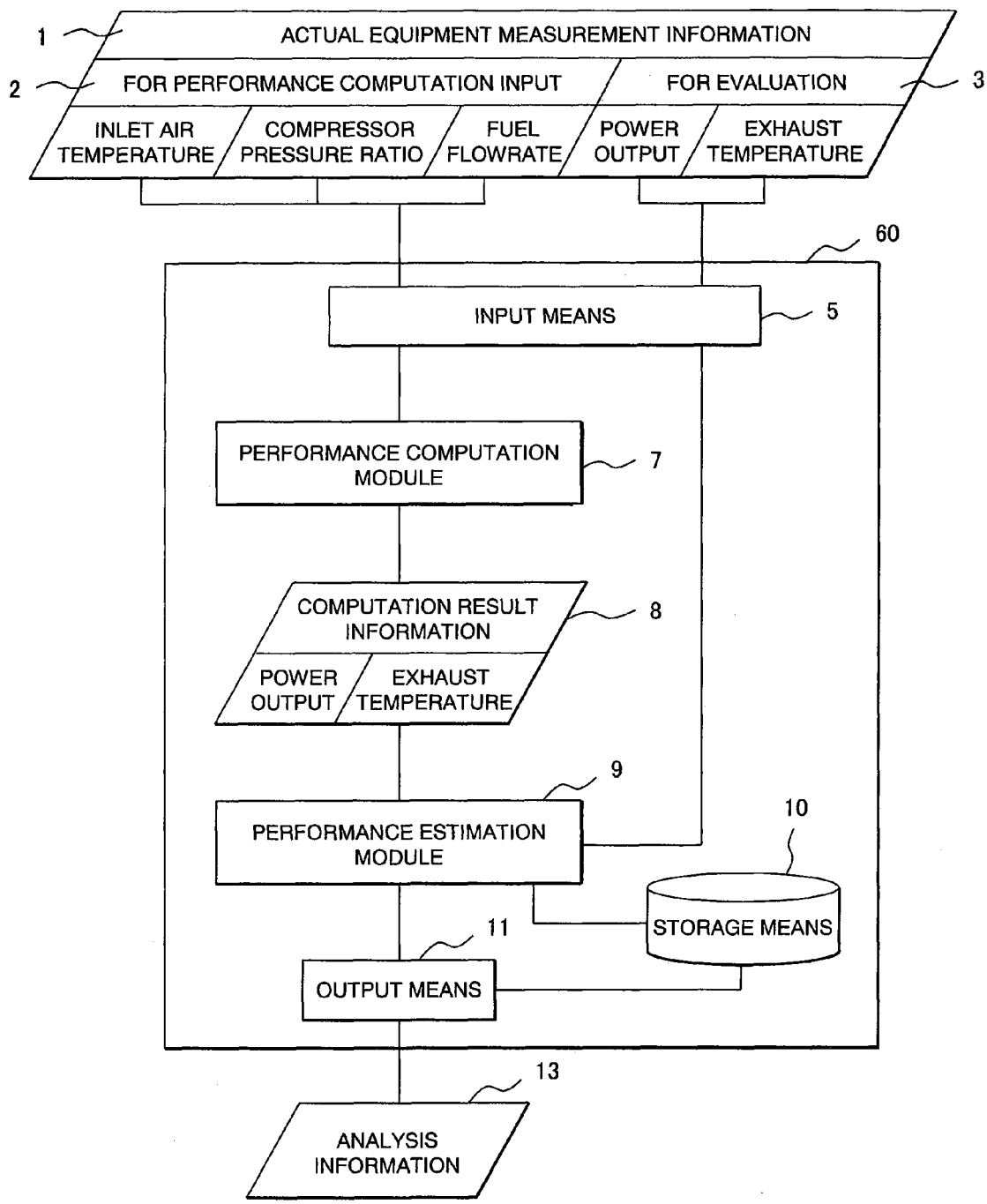
FIG. 6 is a schematic diagram of a conventional gas turbine performance analysis system.

FIG. 6 is a schematic diagram of a typical conventional gas turbine analysis system. Hereafter, this system is called the conventional method. Herein, to analyze problems as described later in this document, situations in which a model adjustment is not conducted are shown. The analysis system 60 comprises an input means 5 for inputting information 2 intended for performance computation input included in actual equipment measurement information 1 of a gas turbine (hereafter, occasionally abbreviated as actual measured value) into a performance computation module 7, the performance computation module 7 for calculating a predicted value of the gas turbine performance based on the inputted information 2, a performance estimation module 9 for evaluating actually measured performance based on the deviation between the computation result information 8 and the evaluation information 3 included in the actual equipment measurement information 1, a storage means 10 for storing evaluation result information outputted from the performance estimation module 9, and an output means 11 for outputting the evaluation result information stored in the storage means 10 or the evaluation result information outputted by the performance estimation module 9 as analysis information 13.

The cycle theory of the conventional analysis system 60 is as described below.

The actual equipment measurement information 1 is input information which is measured values of an actual gas turbine's service conditions and operating state. In addition to the operating conditions including a fuel flow rate being supplied to the gas turbine, the service conditions also include environmental conditions, such as atmospheric temperature, pressure and humidity, which affect gas turbine performance. The measured values of those environmental conditions are not always measured values obtained at a location where actual equipment is installed, but other data such as data provided by a nearby meteorological observatory can also be used instead of data about the actual equipment.

The actual equipment measurement information 1 can be used in two ways: used as input information 2 and used as evaluation information 3. Typical input information 2 includes inlet air temperature of which inlet air is supplied to the compressor of the gas turbine, compressor pressure ratio and fuel flow rate of which fuel is supplied to the gas turbine and is used as service condition information inputted into the performance computation module 7. Typical evaluation information 3 includes power output generated by a generator of the gas turbine and exhaust temperature of which exhaust gas is exhausted from the gas turbine and are used to evaluate the condition of the actual equipment by being compared with the power output and the exhaust temperature calculated by the performance computation module 7.

The input means 5 receives input information 2 included in the actual equipment measurement information 1 as electronic data from the actual gas turbine or a data server connected to the actual gas turbine via a cable or wireless communication line and then inputs the information into the performance computation module 7. Specifically, input information 2 is received by the information receiving apparatus via a communication circuit, the received information is converted into an input format compatible with the performance computation module 7 by the information conversion means, and then the information is inputted. Input information 2 is separated from the actual equipment measurement information 1 at an arbitrary stage during the period prior to being received by the input means 5 till the information is inputted into the performance computation module 7.

Furthermore, in the same manner, the input means 5 receives evaluation information 3 included in the actual equipment measurement information 1 as electronic data from the actual gas turbine or a data server connected to the actual gas turbine via a cable or wireless communication line and then inputs the information into the performance estimation module 9. Specifically, evaluation information 3 is received by the information receiving apparatus via a communication circuit, the received information is converted into an input format compatible with the performance computation module 9 by the information conversion means, and then the information is inputted. Evaluation information 3 is separated from the actual equipment measurement information 1 at an arbitrary stage during the period prior to being received by the input means 5 till the information is inputted into the performance estimation module 9.

The performance computation module 7 receives information 2, which is the actual measured value to be used for performance computation, from the input means 5, computes expected performance of the gas turbine, and outputs the computation result information 8. The computation result information 8 typically includes power output and exhaust temperature. The performance computation module 7 implements known computation methods, such as computation of thermodynamical or aerodynamical cycles or an artificial-intelligence algorithm including a neural network, to be used as a computer program or a dedicated computation module.

Moreover, in the embodiment of the present invention, a device described as a "module" indicates, as an implemented means, a known computation means realized by an electronic means, such as computer programs, arithmetic chips, or dedicated circuits. Furthermore, the device can operate as a single module, and it can also be one component of a plurality of circuits that configure a program or a module. For example, the performance computation module 7 and the performance estimation module 9, described later, have different module names to clearly describe functional configurations, however, they do not have to be two different pieces of hardware and actually, in general, they are implemented as sub-modules that configure one analysis program.

Computation result information 8 calculated by the performance computation module 7 is outputted as electronic data and inputted into the performance estimation module 9.

The performance estimation module 9 evaluates the values of power output and exhaust temperature in the computation result information 8 based on the deviation from information 3 which is the actual measured value used for evaluation. For example, with regard to the power output or the exhaust temperature, if deviation between the value of the computation result information 8 and the value of the information 3 which is the actual measured value used for evaluation exceeds a predetermined threshold, information to trigger an alarm is created. Alternatively, by reading past storage results stored in the storage means 10 described next, a determination of the presence or absence of anomaly based on time-series change, a quantification of the degree of anomaly, or a computation of change in performance can also be executed. In the present invention, in some cases, various operations of the performance estimation module 9 are collectively called the "comparative evaluation between expectation and measurement," and the resulting information is collectively called "compared data."

Compared data of the performance estimation module 9 is stored in the storage means 10. Typical stored information is actual equipment measurement information 1 and computation result information 8. The storage means 10 is a known information storage means, such as hard disks, optical disks, memories and the like. Generally, every time the performance estimation module 9 is executed, compared data is sequentially stored in the storage means 10.

Compared data of the performance estimation module 9 or information stored in the storage means 10 is outputted by the output means 11 to be used as analysis information 13. The output means 11 is a means for outputting information from the analysis system 60 to the outside, and specifically, it is a display screen such as monitors, a file transfer means such as file transfer protocols, a file output means for outputting a data file, an information recording means such as hard disks, or a means for outputting data from an electronic medium to another medium such as printers.

Figure 7:
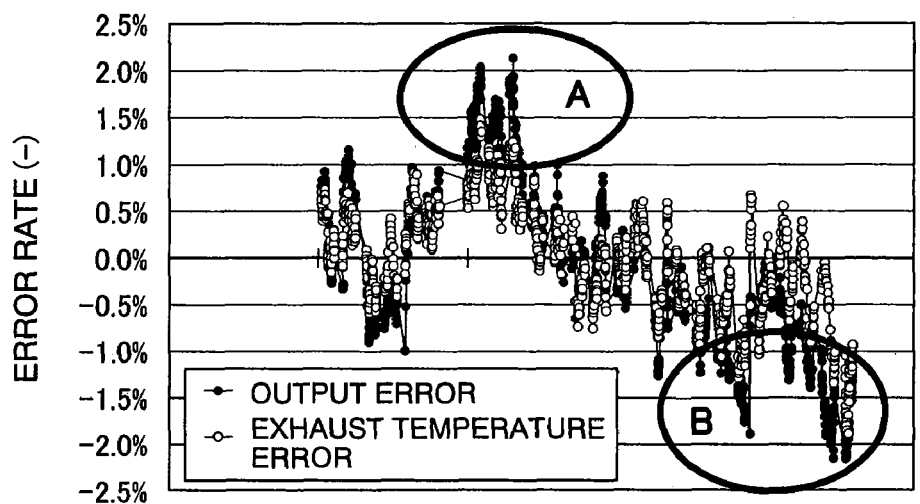
FIG. 7 shows a performance evaluation example (constant rate correction type) according to a conventional method.

To analyze the effectiveness, accuracy, and problems of the conventional method, an example in which gas turbine performance is actually evaluated is shown in FIG. 7. Herein, when an error rate is positive, it indicates that the computed value is larger than the actual measured value, and when the error rate is negative, the computed value is smaller than the actual measured value. In the conventional example shown in FIG. 7, with regard to power output and exhaust temperature, there is a maximum error of nearly 2% between the actual measured value and the computed value. And in area A in FIG. 7, with regard to both the power output and the exhaust temperature, the computed value is larger than the actual measured value, but, in area B, with regard to both the power output and the exhaust temperature, the computed value is smaller than the actual measured value.

This indicates that energy input and output are not balanced. In other words, total input energy of inlet air and fuel which are to be inputted into the gas turbine facility is not equivalent to total output energy of power output, exhaust gas and loss which are outputted from the gas turbine facility. That is, if the actual measured values are used as criteria, computation results indicate that the output energy is much larger than the input energy in area A, and the output energy is insufficient in area B. However, in a computation model of the performance computation module 7 in this case, computation is executed so that energy input and output can be balanced. This indicates that the energy input and output are not balanced with regard to the actual measured values, and not in the computation model of the performance computation module 7. And this is the point we noted.

One of possible causes for the deviation of energy balance between input and output with regard to the actual measured values is the exhaust temperature. The exhaust temperature is measured at more than a dozen points in the circumferential direction at the turbine outlet of the gas turbine, and a median or a mean value is represented as the value and used for the performance evaluation and the plant operation control. However, actually, there are complicated factors, such as the temperature decrease from the turbine outlet to the exhaust gas duct, the temperature distribution in the circumferential direction and in the diameter direction on the cross-section where thermocouples are set, and voltecs flow. Therefore, the above-mentioned representative value does not match the thermodynamically balanced true value of exhaust temperature.

However, it is extremely difficult to estimate a true value of the exhaust temperature by considering all of those complicated factors. Accordingly, it is necessary to provide a simple and efficient method that can solve the problems with the deviation of energy balance so that accurate performance evaluation can be achieved.

While considering the above-mentioned complicated phenomena about the exhaust temperature, to find a simple and practical solution, first, we found the dominating factors that affect the deviation of energy balance by conducting thermodynamical analysis and then established a model adjustment method.

First of all, to find dominating factors that affect the deviation of energy balance, as described below, we organized relevant factors along the power cycle of the gas turbine, simplified the factors, and then identified the dominating factors.

First, based on the gas turbine cycle theory, deviation $\Delta H$ of the measured energy balance between input and output energy was formed into a model, as shown in equation (1), as a function of three elements: compressor efficiency $\eta c$ that affects compressor work, turbine efficiency $\eta t$ that affects turbine work, and fuel energy input QF that accounts for most of the energy input. Herein, f represents a function and will do the same hereafter.

$$\Delta H = f(\eta c, \eta t, QF) \quad \text{Equation (1)}$$

The compressor efficiency and the turbine efficiency on the right-hand side of equation (1) can thermodynamically be calculated based on temperatures and pressures at the each inlet and each outlet of the compressor and the turbine. However, to simplify the equation, we omitted the exit temperature, replaced the turbine's pressure ratio with the compressor's pressure ratio, and assumed the relation between equations (2) and (3). Herein, Tci represents an inlet air temperature, Tti represents a turbine inlet temperature, and $\phi c$ represents a compressor pressure ratio.

$$\eta c = f(Tci, \Phi c) \quad \text{Equation (2)}$$

$$\eta t = f(Tti, \Phi c) \quad \text{Equation (3)}$$

We considered turbine inlet temperature Tti on the right-hand side of equation (3) to be equation (4) based on the energy balance between input and output energy. Herein, Tcd represents a compressor outlet temperature.

$$Tti = f(Tcd, QF) \quad \text{Equation (4)}$$

Compressor outlet temperature Tcd on the right-hand side of the equation (4) can thermodynamically be shown as equation (5).

$$Tcd = f(Tci, \eta c)| \quad \text{Equation (5)}$$

(1) through (5) give equation (6).

$$\Delta H = f(Tci, \Phi c, QF) \quad \text{Equation (6)}$$

Thus, we found roughly three dominating factors which affect the deviation of the energy balance between input and output energy: inlet air temperature of the compressor, compressor pressure ratio, and fuel energy.

Next, by using the inlet air temperature, compressor pressure ratio, and fuel energy which are the dominating factors thus detected, we studied a method of correcting the deviation of energy balance. To correct the energy imbalance, we specifically studied and examined which factor should be corrected and decided to correct the fuel flow rate.

The reason of this is as described below. To correct energy imbalance, it is necessary to correct either the inside of the main body of the model or the energy input or output. Since it is a given fact that energy input and output are balanced in the model, adjusting and altering the inside of the main body would ignore this premise and therefore, such adjustments and alterations would be improper. Furthermore, the power output and exhaust temperature which are outputs are used to analyze degradation and anomaly of the gas turbine performance. Therefore, correcting those outputs is also improper. Accordingly, either the fuel flow rate or the inlet air flow rate both of which are inputs must be corrected. Of those, because the amount of energy of the fuel flow rate is significantly great and influential, we chose the fuel flow rate as an item to be corrected.

Thus, we decided to use the fuel flow rate as an item to be corrected and established a correction formula to correct the deviation of energy balance as shown below. In equation (8), we simplified the function and assumed a linear relation, and in both equations (7) and (8), we replaced the fuel energy, which must be calculated, with the fuel flow rate that can be directly measured.

$$Gf\_cor = \gamma \times Gf \quad \text{Equation (7)}$$

$$\gamma = f(Tci, \Phi c, Gf) \quad \text{Equation (8)}$$
$$= (a1 \times Tci + a2 \times \Phi c + a3 \times Gf) + b|$$

Herein, Gf denotes a fuel flow rate, Gf_cor denotes a corrected fuel flow rate, $\gamma$ denotes a correction coefficient, ai(1=1,2,3) denotes a coefficient, and b denotes a constant term.

Figure 1:
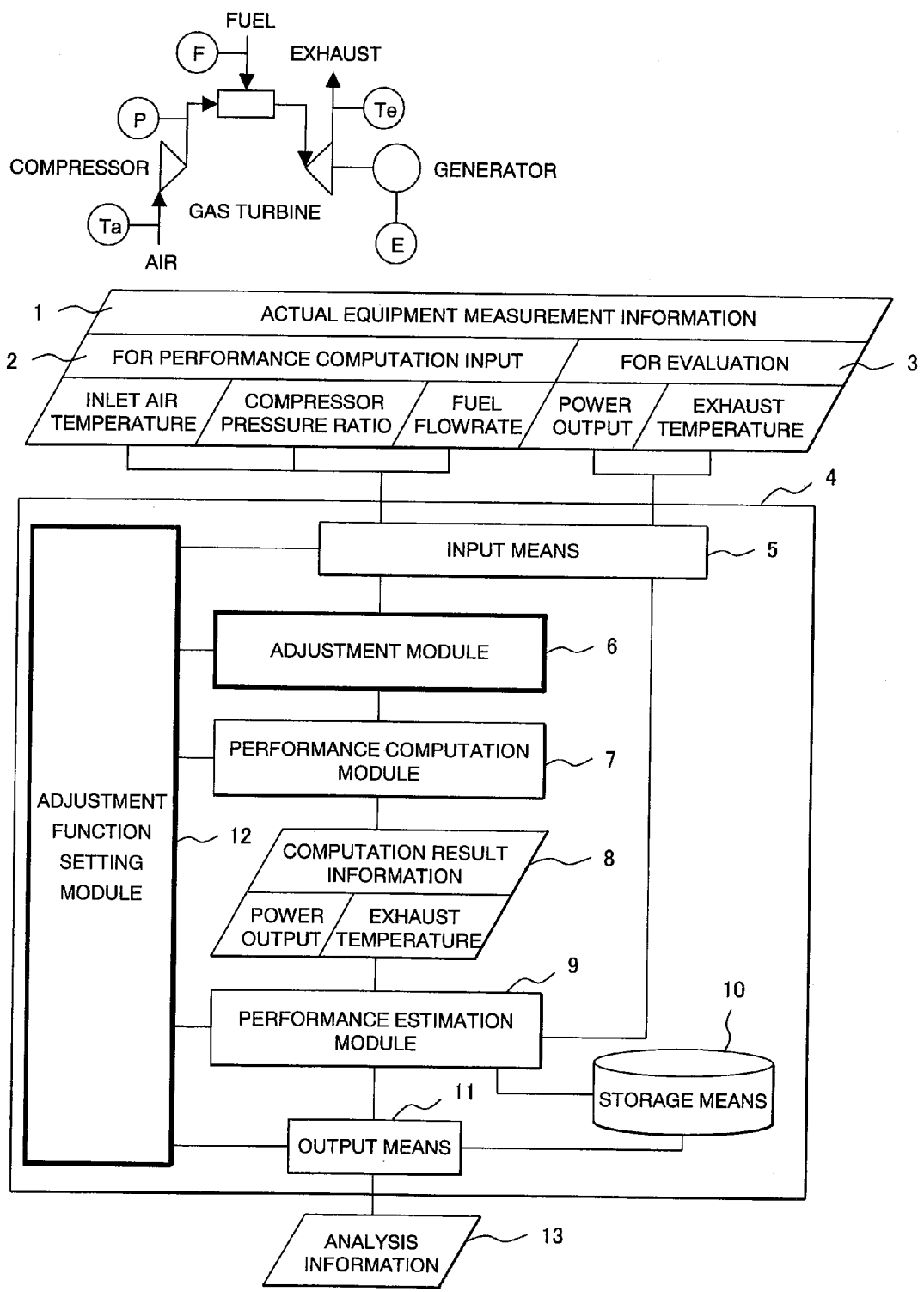
FIG. 1 is a schematic diagram of a gas turbine performance analysis system according to an embodiment of the present invention.

Configuration of the Gas Turbine Performance Analysis System According to an Embodiment of the Present Invention Based on the above-mentioned analysis, FIG. 1 shows a schematic diagram of a gas turbine performance analysis system 4 according to an embodiment of the present invention. In addition to the components of the conventional gas turbine performance analysis system shown in FIG. 6, the gas turbine performance analysis system 4 shown in FIG. 1 comprises an adjustment module 6 which corrects the value of the fuel flow rate included in the actual equipment measurement information, which is to be inputted for performance computation, according to the above-mentioned relation between equations (7) and (8), and an adjustment function setting module 12 which configures the content data of the adjustment module 6.

The actual measured values of the gas turbine, which is to be inputted for gas turbine performance analysis system 4, are followings as shown in FIG. 1. That is, inlet air temperature Ta of which inlet air being supplied to compressor, compressor pressure ratio P, fuel flow rate F of which fuel being supplied to and combusted in the gas turbine, power output E of generator, and exhaust temperature Te of which exhaust gas being exhausted from the gas turbine.

The adjustment module 6 is a computation module in which functions of equations (7) and (8) are implemented. In this module, according to those calculation formulas, computation is executed to correct the actual measured value of the fuel flow rate by using the function of the inlet air temperature of the compressor, compressor pressure ratio and the fuel flow rate. Then, among performance computation input data, the original value of the fuel flow rate is replaced with the corrected value of the fuel flow rate (corrected fuel flow rate) and then the value is inputted into the performance computation module 7.

Figure 2:
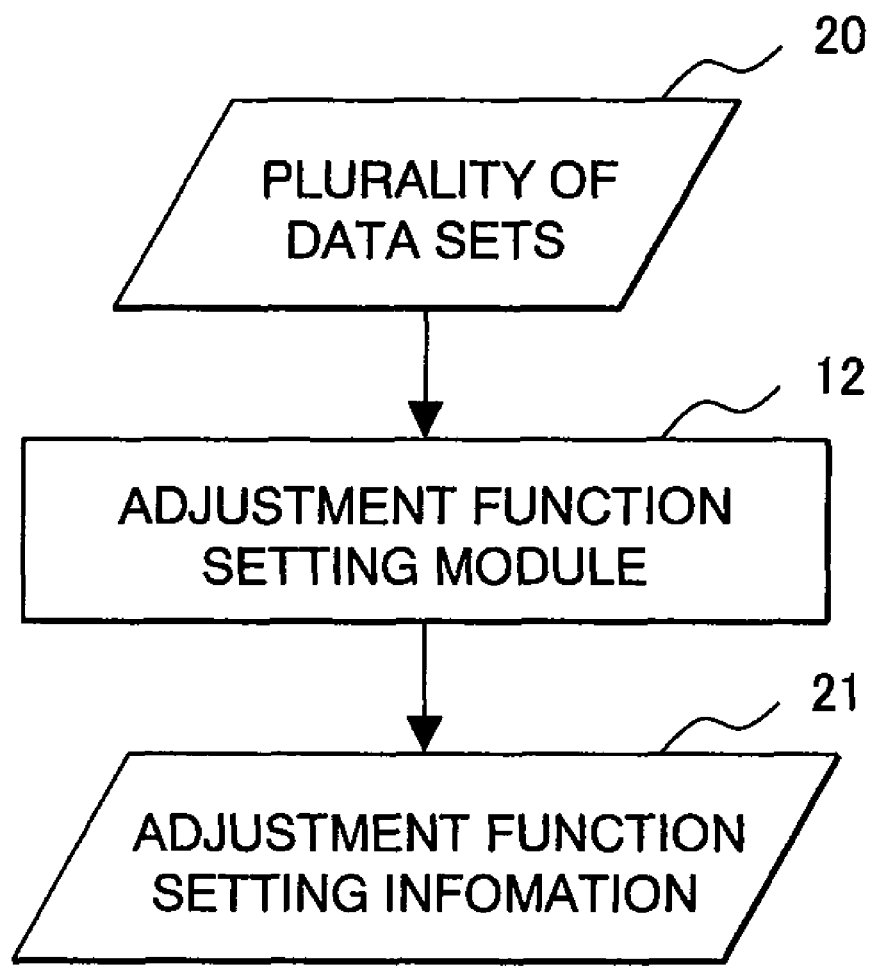
FIG. 2 is an input/output diagram showing the functions of an adjustment function setting module in the gas turbine performance analysis system shown in FIG. 1.

Herein, specific contents of equations (7) and (8), which are content data of function f of equation (8), coefficients a1 to a3, and the value of constant term b, are predetermined by the adjustment function setting module 12. As shown in FIG. 2, based on a plurality of units of data 20 obtained in a certain procedure (hereafter, referred to as a plurality of data sets), the adjustment function setting module 12 executes a computation to specifically determine the undetermined constant of the adjustment function (equations (7) and (8)) in the adjustment module 6.

A plurality of data sets 20 are time-series data of a specific period or data about a plurality of different operating conditions with regard to the actual measured values of the gas turbine including inlet air temperature of compressor, compressor pressure ratio, fuel flow rate, power output of generator, and exhaust temperature. Hereafter, a set of actual measured values of the gas turbine including inlet air temperature of compressor, compressor pressure ratio, fuel flow rate, power output of generator, and exhaust temperature measured under a specific condition or at a point in time is called a data set, and sets of values measured under a plurality of conditions or at a plurality of points of time are called a plurality of data sets. Furthermore, the inlet air temperature, compressor pressure ratio, and the fuel flow rate are collectively called input information 2, and the power output and the exhaust temperature are collectively called evaluation information 3.

Moreover, function f shown in the above equation (8), even if it is not formed into an equation, includes an algorithm in which items shown in parentheses on the right-hand side are included as input and items shown in parentheses on the left-hand side are included in output. Therefore, setting the adjustment function in the adjustment function setting module 12 is not limited to the determination of the equation that expresses function f of equation (8) and the constant such as coefficient included in the equation, but, in the broad sense, even if an algorithm is not explicitly formed into an equation, determination of the set value necessary to execute a computation is included. In other words, setting the adjustment function means the overall settings necessary to execute a computation that outputs, when inputting inlet air temperature, compressor pressure ration, and fuel flow rate, the corrected fuel flow rate.

(Processing Flow Executed by the Adjustment Function Setting Module).

Figure 3:
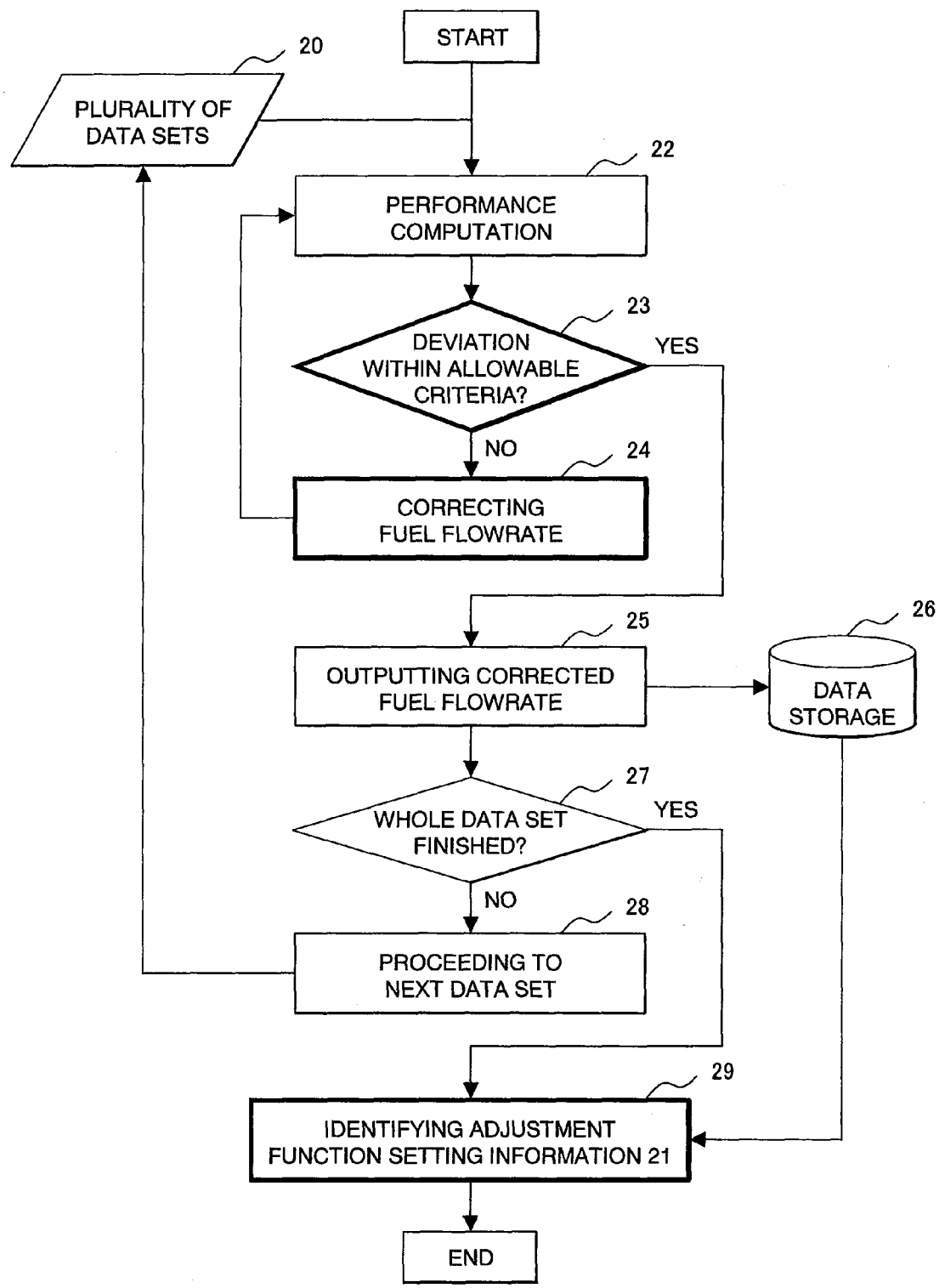
FIG. 3 is a processing flowchart of an adjustment function setting module in the gas turbine performance analysis system shown in FIG. 1.

To explain operations of the adjustment function setting module 12 in detail, FIG. 3 shows the processing flow. The processing flow is roughly classified into two parts: the first half and the latter half. In the first half part (processes 22 to 28), the corrected value of the fuel flow rate (corrected fuel flow rate) and the correction coefficient (described later) are obtained by the iterative convergence so that with regard to each data set of the plurality of data sets 20, the deviation between the computed values of power output and exhaust temperature obtained by the performance computation and the actual measured values is within predetermined allowable criteria. In the latter half part (process 29), based on the correction coefficients of all data sets (all of the plurality of data sets 20) thus obtained and the corresponding inlet air temperature, compressor pressure ratio, and fuel flow rate, the coefficient and the constant term of equation (8) are determined by fitting. Hereafter, each process will be described sequentially.

In the performance computation process 22 which is a part of the loop wherein operation proceeds to the next data set in process 28 (described later), gas turbine performance computation is executed by using a single data set at that point (included in a plurality of data sets 20) as input data. The contents of the performance computation are the same as those of the computation executed by the above-mentioned performance computation module 7 (FIG. 6).

The performance computation results obtained in performance computation process 22, which are the computed values of the power output and the exhaust temperature, are compared with the actual measured values included in the corresponding data set, that is, evaluation information 2, and it is determined in determination process 23 whether the deviation between the computed value and the actual measured value is within predetermined allowable criteria.

If the determined result is false, in subsequent revision process 24, the value of the fuel flow rate is revised, and the original fuel value included in the corresponding data set is replaced with the revised fuel flow rate value, and then the performance computation is executed again. The revision of the fuel flow rate and the performance computation by using the revised value are repeatedly executed until the determined result in determination process 23 becomes true.

The predetermined allowable criteria in the above-mentioned determination process 23 indicate, for example, whether the deviation rate or the absolute value of the deviation between the actual measured value and the computed value with regard to power output and exhaust temperature, respectively, is within predetermined upper and lower limits. Furthermore, it is desirable for it to be determined whether the sum of the deviation rates is within predetermined upper and lower limits. The criteria in the determination process 23 are not limited to the above, but it is acceptable for it to be determined whether the degree of deviation between the actual measured value and the computed value with regard to the power output and the exhaust temperature, respectively, is within an allowable range by using the predetermined criteria.

As an example of the fuel flow rate correction methods in the revision process 24, the deviation between the computed value and the actual measured value with regard to the power output and the exhaust temperature, respectively, is converted into an equivalent amount of energy (herein, the exhaust temperature is calculated as enthalpy of exhaust gas), and correction coefficient γ is calculated by using summation $\Delta H\_er$ of the deviations and the fuel energy input QF as shown in equation (9). And then, by inputting the obtained value into equation (7), it is possible to determine the corrected value of the fuel flow rate. Herein, k denotes a coefficient used to adjust the number of computations and accuracy.

$$\gamma = 1 - k \times \Delta H\_er/QF \qquad \text{Equation (9)}$$

Herein, the reason why γ was described as a "revision" coefficient is that the coefficient is different from the "correction" coefficient described related to the equations (7) and (8). That is, the "correction" coefficient described in the equations (7) and (8) is a "correction" coefficient that is used to calculate the "corrected value" of the fuel flow rate by using a predetermined function. On the other hand, the "revision" coefficient is a coefficient related to the "corrected value" of the fuel flow rate which has been obtained by executing revisions by means of iterative computation by seeking convergence so that the computed value matches the actual measured value. Accordingly, different names have been given to those coefficients.

The above-mentioned fuel flow rate correction method is merely an example, and as long as the amount of revision of the fuel flow rate is obtained to detect the value that satisfies the determination criteria in determination process 23, other methods, such as a known optimization calculation and a convergence calculation method can be used. Alternatively, instead of providing a determination with regard to an individual data set as shown in the determination process 23, contents of the functions of the above equations (7) and (8) can be set according to the criteria which judge whether an index value showing a deviation in the all data sets, such as a mean value or a maximum value of the deviation between the computed power output and exhaust temperature and the actual measured values with regard to a plurality of data sets, is within a predetermined allowable range. In other words, optimization or convergence calculation method can be used wherein an equation of a function or an undetermined constant is determined as stated above, or a set value for operating an algorithm is determined.

When the determined result in the determination process 23 becomes true as the result of the revision of the fuel flow rate and the performance computation by using the revised value, the corrected value of the fuel flow rate and the value of correction coefficient γ are outputted by output process 25 and sent to data storage process 26. At this time, values of inlet air temperature, compressor pressure ratio, and original fuel flow rate of each data set are also sent and stored in the data storage process 26.

Operations from process 22 to process 25 are repeatedly controlled by data-set loop-end determination process 27 and process 28 wherein operation proceeds to the next data set until processing of all of the plurality of data sets 20 is completed.

When repeated operations of all data sets have been completed, in process 29 which is the latter half part, the function of equation (8) is identified by fitting based on the correction coefficient γ of all data sets and the data about the corresponding inlet air temperature, compressor pressure ratio, and fuel flow rate stored in the data storage process 26. In the simplest fitting method, the least squares regression is applied to the linear function of the second equation of equation (8) and the equation's coefficient and constant term are determined. However, an equation of the function is not limited to the linear function, and any function is available as long as correction coefficient γ is expressed as a function of the inlet air temperature, compressor pressure ratio, and the fuel flow rate. Furthermore, the fitting method is not limited to the linear least squares regression, and it can be a known optimization or a regression analysis method wherein an undetermined constant of the function can be determined so that the deviation between the computed value and the actual measured value is small.

Herein, to simplify the explanation of the function's equation, a correction coefficient is provided on the left-hand side of equation (8). However, it goes without saying that the fuel flow rate can be directly computed by providing a corrected fuel flow rate on the left-hand side instead of using a correction coefficient. In this case, the function setting procedure is executed by the same procedure as mentioned above in which a correction coefficient is provided on the left-hand side.

(Schematic Diagram of the Adjustment Function Setting Module)

Figure 4:
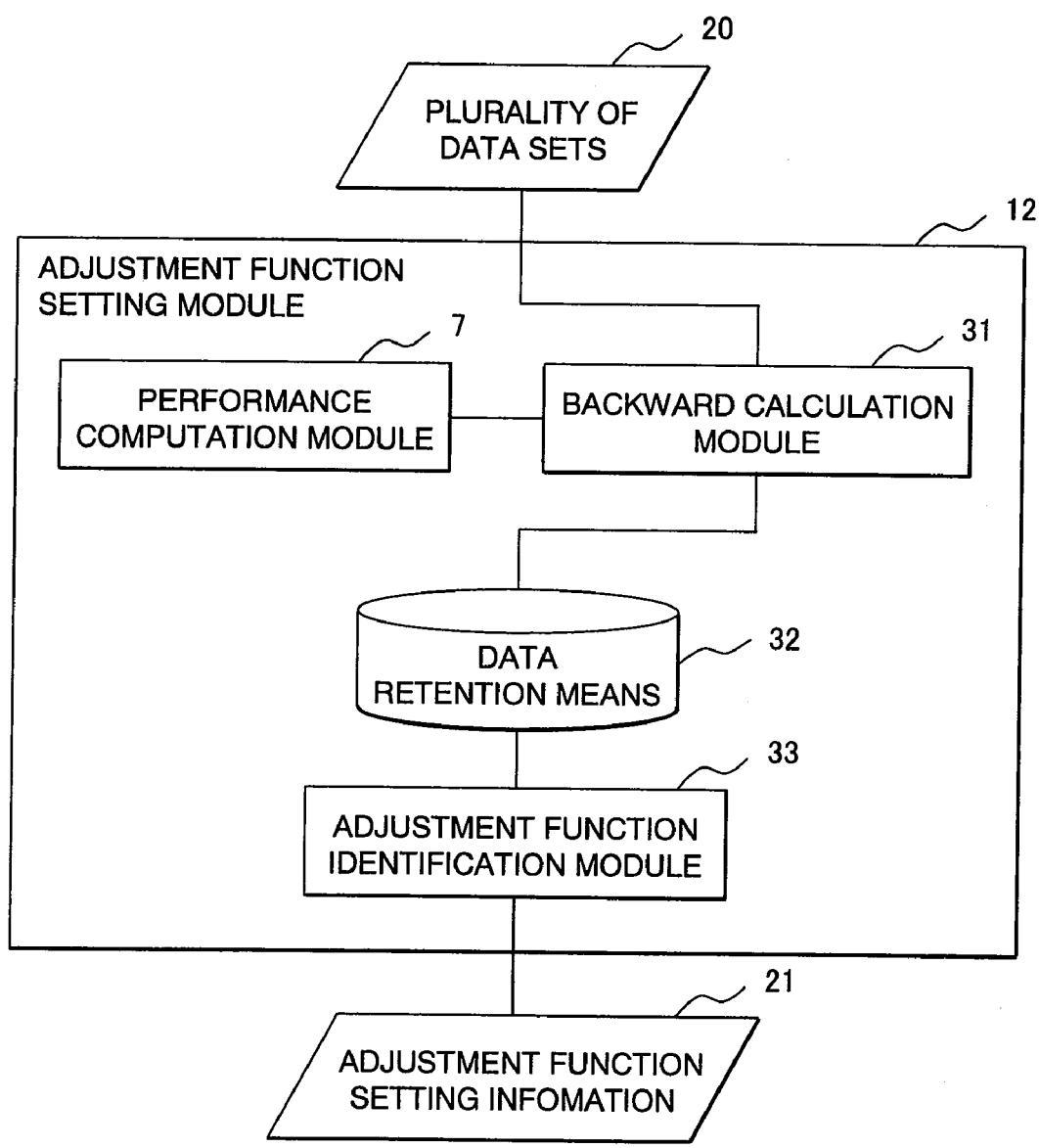
FIG. 4 is a schematic diagram of an adjustment function setting module in the gas turbine performance analysis system shown in FIG. 1.

FIG. 4 shows a schematic diagram of an adjustment function setting module 12 which realizes the above-mentioned processing flow. The adjustment function setting module 12 comprises a backward calculation module 31 which activates a performance computation module 7 by using a plurality of data sets 20 and calculates a corrected value of the fuel flow rate or a correction coefficient, a data retention means 32 which sequentially stores the corrected value of the fuel flow rate or the correction coefficient calculated by the backward calculation module 31 along with the values of each data set's inlet air temperature, compressor pressure ratio, and original fuel flow rate, and an adjustment function identification module 33 which identifies the adjustment function setting information 21 based on the information stored in the data retention means 32 and outputs the information. Herein, a device described as a "module" indicates an electronic arithmetic module, such as computer programs or dedicated chips, as already stated in the description of the analysis system in FIG. 6. Hereafter, each module will be sequentially described.

At least three elements described below are implemented in the backward calculation module 31. Firstly, there is implemented a convergence calculation loop comprising a function to activate and execute the performance computation process 22 (performance computation module 7) to calculate gas turbine performance in order to activate the performance computation module 7 so that the corrected value of the fuel flow rate or the correction coefficient can be calculated and determined, determination process 23 to determine computation result, and revision process 24 to revise the fuel flow rate if the obtained determined result is false. Secondary, output process 25 is implemented wherein the corrected value of the fuel flow rate or the correction coefficient calculated by means of the convergence calculation is outputted along with values of inlet air temperature, compressor pressure ratio, and original fuel flow rate of each corresponding data set. Thirdly, the loop control module (processes 27, 28) is implemented which repeatedly executes convergence calculations of all of the plurality of data sets 20.

The performance computation module 7 is an implementing module which executes performance computation in the performance computation process 22, and as described in the explanation of FIG. 6 where performance analysis was explained, computation operations are to calculate gas turbine performance based on the input information including the inlet air temperature, compressor pressure ratio, and the fuel flow rate and output computation result information including power output and exhaust temperature.

The data retention means 32 is a means for executing the data storage process 26 wherein values of correction coefficient γ of all data sets calculated by the backward calculation module 31 are stored along with values of the inlet air temperature, compressor pressure ratio, and original fuel flow rate of each corresponding data set. The data retention means 32 is typically implemented as a temporary storage area such as a computer memory, however, it is not limited to it and can be a medium which electronically stores data.

The adjustment function identification module 33 implements an arithmetic procedure of process 29 wherein adjustment function setting information is identified. A specific set value for the undetermined constant of the function of equation (8) is determined by computation executed in process 29 and outputted as adjustment function setting information 21.

(Performance Analysis Execution Method by Using a Configured Adjustment Module)

Figure 5:
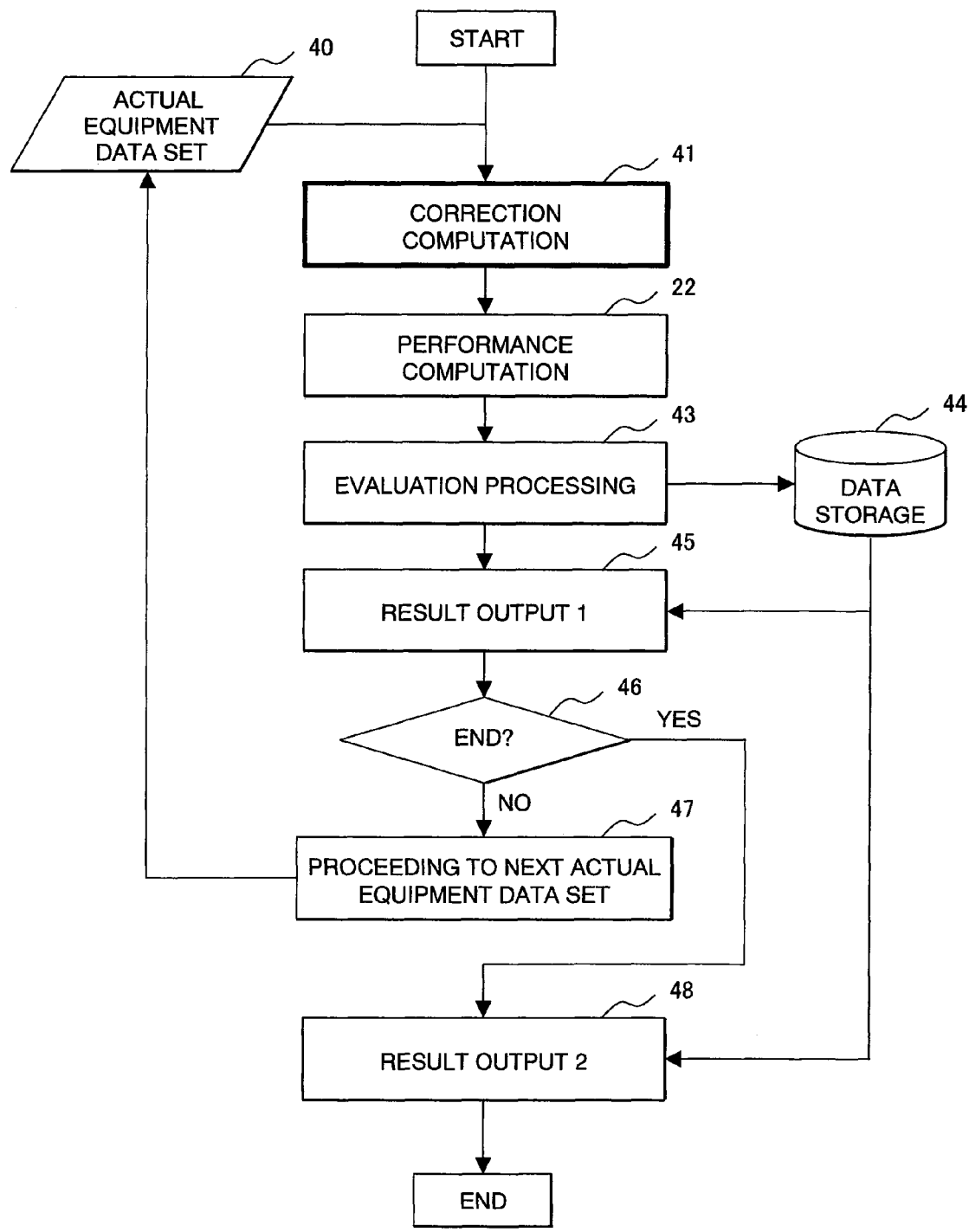
FIG. 5 is a flowchart of the performance analysis that uses a configured adjustment module in the gas turbine performance analysis system shown in FIG. 4.

In the gas turbine performance analysis system according to the embodiment of the present invention, adjustment function setting information 21 (FIG. 4) determined by the adjustment function setting module 12 as stated above is used for the adjustment module 6 (FIG. 1). The flow of the analysis is shown in FIG. 5.

The processing flow comprises a correction computation process 41 in which actual measured values of the actual equipment's inlet air temperature Ta, compressor pressure ratio P, fuel flow rate F, power output E, and exhaust temperature Te (hereafter, it is called an actual equipment's data set 40) are inputted and the corrected value of the fuel flow rate is calculated by using the adjustment module 6 configured as explained in FIG. 3 and FIG. 4; a performance computation process 22 in which gas turbine performance is calculated by using the corrected value of the fuel flow rate calculated in the correction computation process 41 as input data; an evaluation process 43 in which computation results obtained in the performance computation process 22 are evaluated; a data storage process 44 in which information outputted in the evaluation process 43 is stored; a result output process 45 in which information outputted in the evaluation process 43 or information stored in the data storage process 44 is outputted; an end determination process 46 in which operations from processes 41 to 45 are repeatedly executed for actual equipment's data set; a process 47 in which operation proceeds to the next data set; and a result output process 48 in which evaluation results of the entire data set are outputted. Hereafter, each process will be described.

In the correction computation process 41, actual measured values of the actual equipment's inlet air temperature, compressor pressure ratio, and fuel flow rate included in the actual equipment's data set are inputted into the adjustment module 6 configured as explained in FIG. 3 and FIG. 4, that is, the adjustment module 6 of the fuel flow rate in which a value of the undetermined constant of the function of the equations (7) and (8) has been determined, and the corrected value of the fuel flow rate is calculated.

In the subsequent performance computation process 22, among the actual equipment's data set's performance computation input data (inlet air temperature, compressor pressure ratio, fuel flow rate), the value of the fuel flow rate is replaced with the value corrected in the correction computation process 41 and inputted. Specifically, the performance computation module 7 is executed based on the input data, gas turbine performance is computed, and items including power output and exhaust temperature are calculated. Moreover, the computation results will become computation result information 8 described in the explanation about FIG. 1.

Thus, the computed values of power output and exhaust temperature obtained in the performance computation process 22 are compared in evaluation process 43 with each actual measured value, that is, the actual measured values of power output and exhaust temperature for evaluation included in the actual equipment's data set 40 and evaluated. Specifically, this evaluation is executed by the above-mentioned performance estimation module 9 (FIG. 1, FIG. 6).

Result information evaluated in the evaluation process 43 or information provided for evaluation, that is, information of each item of the actual equipment's data set 40 and computation result information 8 (FIG. 1) in performance computation process 22 are stored in data storage process 44. Specifically, the data storage process 44 is executed by the same hardware as the above-mentioned storage means 10 (FIG. 1, FIG. 6).

The result information thus evaluated in the evaluation process 43 or information stored in the data storage process 44 is outputted in the subsequent result output process 45. Specifically, data is outputted by the above-mentioned output means 11 (FIG. 1, FIG. 6).

Computation in correction computation process 41 and performance computation process 22, subsequent evaluation of the computed values and the actual measured values (evaluation process 43), data storage (data storage process 44), and result output (result output process 45) are repeatedly executed with regard to the actual equipment's data set 40 of a certain period or the overall data set. The repetition of operations is controlled by repeating process 47 in which operation proceeds to the next data set until the data becomes true in end determination process 46, that is, until the end of the operations is determined. Herein, end determination means the determination of whether computation for analysis is to be continued or not, for example, by judging whether the computation of all data of the actual equipment's data set 40 has been finished or whether a command to quit analysis has been entered by a user.

As the result of the repeated operations that continue until end determination is made, evaluation result information stored in the data storage process 44 is outputted in result output process 48. Specifically, data is outputted by the above-mentioned output means 11 (FIG. 1, FIG. 6).

Moreover, with regard to the output of results, the above-mentioned combination of result output processes 45 and 48 is an example. The difference between those two processes is the output timing. Aside from whether the amount of processed data is the whole data sets of the actual equipment or a portion of the data set, output data is the same, and the output timing and contents of data can be either one of them. For example, when all data sets of the actual equipment of a specific period are batch-processed repeatedly, the results are outputted at the timing of result output process 48. Furthermore, when the system is automatically activated periodically, for example, daily, and data sets created after previous activation are repeatedly processed, the results are outputted in the same manner. On the contrary, for example, when the system is connected online to the actual equipment measurement system and evaluation is conducted in real time, results, specifically an alarm, are outputted at the timing of result output process 45.

Analysis Example

To verify the improved performance evaluation accuracy of the method of the present invention, a model adjustment method according to the present invention was applied to the performance evaluation of the actual equipment and accuracy was evaluated. Table 1 shows the model adjustment methods which were compared one another. As an example of the conventional method, a simple method (constant rate correction type) is shown wherein correction is made by multiplying a correction coefficient of the constant value. Furthermore, with regard to the method of the present invention, a method (simplified type) is also shown wherein uninfluential factors are excluded and correction is made by using only inlet air temperature. The method of the present invention wherein all of is called a full type to distinguish it from the simplified type. By using actual equipment's operation data, model adjustment was conducted by each method, and by using the results for the performance computation executed by the procedure shown in FIG. 5, the maximum value (absolute value), mean value (absolute value), and the standard deviation of the error between the computed values of power output and exhaust temperature and the actual measured values were evaluated.

At this time, the constant rate correction type model adjustment was executed by using the constant value for the correction coefficient $\gamma$ of the above-mentioned equation (7) so that the error is minimized in the entire evaluation period. The simplified type model adjustment was executed by using an equation, which excludes the compressor pressure ratio and the fuel flow rate from the above-mentioned equation (8), as a model equation according to the same procedure as the full type model adjustment. The full type model adjustment was executed according to the procedure described in the explanation about FIG. 3.

Figure 8:
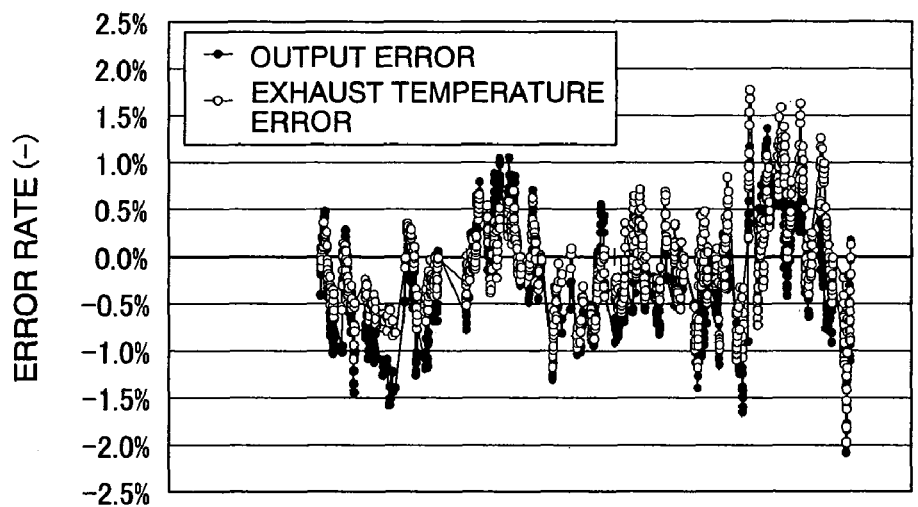
FIG. 8 shows a performance evaluation example (simplified type) according to a method of the present invention.
Figure 9:
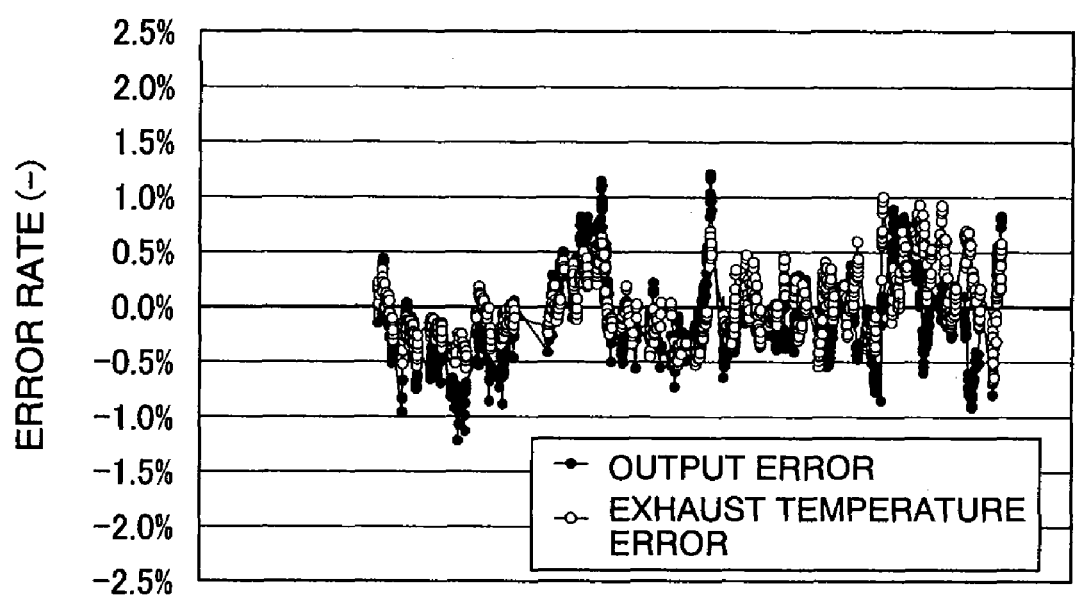
FIG. 9 shows a performance evaluation example (full type) according to a method of the present invention.

FIG. 7 through FIG. 9 show the changes of resulting error rates, and Table 2 through Table 4 show the statistical value of the error. As the results show, according to the constant rate correction type as shown in FIG. 7, the error rate exceeded maximum of 2% for both power output and exhaust temperature; according to the simplified type as shown in FIG. 8, the error rate was reduced to nearly within 1.5%; and according to the full type as shown in FIG. 9, the error rate was reduced to nearly within 1%. When compared with the conventional constant rate correction type, the simplified type of the present invention could not improve the error of the exhaust temperature as shown in Tables 2 and 3, however, it reduced the mean value and the standard deviation of the power output error to two thirds. When compared with the simplified type, the full type almost halved the maximum value of the error of both the power output and the exhaust temperature as shown in Tables 3 and 4 and reduced the mean value and the standard deviation to two thirds.

As stated above, it was found out that the simplified type can improve accuracy more than the conventional type, and the full type can further improve the accuracy. The difference between the simplified type and the full type appeared to be a difference not only in the degree of improvement of power output errors but also a difference in the degree of reduction in exhaust temperature errors. This may be the advantage of the full type because the full type uses all of the factors that were found to correct the deviation in energy balance.

Moreover, in the above example, the simplified type uses only inlet air temperature to correct fuel flow rate. However, if both inlet air temperature and compressor pressure ratio, or both inlet air temperature and fuel flow rate are to be used to correct the fuel flow rate, it is expected that the accuracy will be improved to become almost close to the accuracy obtained by the full type.

TABLE 1

Model adjustment methods comparatively evaluated

| | | Parameter used to correct fuel flow rate | | |
|---|---|---|---|---|
| No. | Method of adjustment | Fuel flow rate | Inlet air temperature | Compressor pressure ratio |
| 1 | Conventional method | Constant rate correction type | ○ | — | — |
| 2 | Method of the present invention | Simplified type | — | ○ | — |
| 3 | | Full type | ○ | ○ | ○ |

In the Table 1, symbol "○" means that the corresponding parameter is considered in the model adjustment method.

TABLE 2

Performance evaluation error by the constant rate correction type model adjustment method

| | Power output | Exhaust temperature |
|---|---|---|
| Maximum value (absolute value) | 2.16% | 1.89% |
| Mean value (absolute value) | 0.75% | 0.48% |
| Standard deviation | 0.90% | 0.59% |

TABLE 3

Performance evaluation error by the simplified type model adjustment method

| | Power output | Exhaust temperature |
|---|---|---|
| Maximum value (absolute value) | 2.09% | 1.98% |
| Mean value (absolute value) | 0.51% | 0.42% |
| Standard deviation | 0.58% | 0.52% |

TABLE 4

Performance evaluation error by the full type model adjustment method

| | Power output | Exhaust temperature |
|---|---|---|
| Maximum value (absolute value) | 1.22% | 1.00% |
| Mean value (absolute value) | 0.33% | 0.24% |
| Standard deviation | 0.40% | 0.30% |

(Comparison Between the Method of the Present Invention and the Alternative)

As stated above, the present invention proposes to correct the fuel flow rate in order to correct the deviation in energy balance between input and output energy. On the other hand, the main cause of the deviation in energy balance is considered to be the deviation between the measurement value of the exhaust temperature and the theoretical value. Therefore, there could be an approach to correct the exhaust temperature. Nevertheless, the reason why fuel flow rate is corrected is the practical advantages described below.

That is, if the conventional method shown in FIG. 6 is used to correct exhaust temperature, among the errors of power output and exhaust temperature, the exhaust temperature is corrected, but the power output is not corrected and the error remains unchanged (in the case of the analysis example in FIG. 7, the value of the power output error remains unchanged). Other than the deviation in energy balance, there are lots of factors to be considered to correct the error of the power output; for example, deviation between the performance characteristics obtained by the gas turbine performance computation module and those of the actual equipment, and so on. To correct those factors, it is necessary to newly provide a power output adjustment module based on the gas turbine performance characteristics. To do so, it is necessary to study a variety of complicated factors including deviation between the performance maps of each component device in the gas turbine performance computation model and the actual equipment. Furthermore, since the power output is corrected, the correction affects the exhaust temperature. Therefore, it is necessary to establish a model by making a proper correlation between the correction of power output and the correction of exhaust temperature and to combine the model with both adjustment modules. These procedures are too complicated for the purpose of correction, and accordingly, the system becomes complicated increasing operating costs and labor.

On the other hand, in the fuel flow rate correction procedure according to the present invention, by inputting the corrected fuel flow rate into the performance computation module, not only the computed exhaust temperature but also power output changes. For this reason, by simply configuring a single adjustment module 6 (equations (7) and (8)) by using the adjustment function setting module 12, the model adjustment can be executed so that errors of both power output and exhaust temperature can be small. The method according to the present invention is created such that correction can be made by simply correcting only the fuel flow rate among various error factors such as deviation in energy balance between input and output energy and the deviation between the gas turbine performance characteristics and the actual measured values. Therefore, the alteration or adjustment of the main body of the performance computation module 7, which is the center of performance analysis, can be minimized and the adjustment and operation of the analysis system can be executed easily and efficiently.

According to the embodiment of the present invention, it is possible to adjust complicated factors related to the deviation between the actual measured value and the computed value by correcting only the fuel flow rate (adjustment module 6) using three input items (inlet air temperature, compressor pressure ratio, and fuel flow rate). Furthermore, the adjustment function setting module 12 to configure the adjustment module 6 can also be executed by using data of only five items which include power output and exhaust temperature in addition to the above three items. The reason why such complicated error factors can be adjusted by using the data of only a few items is that the entire gas turbine cycle was thermodynamically analyzed in a comprehensive manner and efforts were made to retrieve dominating factors by simplification (equations (1) to (6)).

What is claimed is:

1. A gas turbine performance analysis system comprising:
a performance computation module for receiving each of actual measured values of an inlet air temperature introduced to a compressor, a compressor pressure ratio and a fuel flow rate supplied to a gas turbine in the actual gas turbine and calculating and outputting values of the gas turbine's power output and exhaust temperature exhausted from the gas turbine based on these actual measured values; and
a performance estimation module for evaluating performance of the gas turbine based on the deviation between the values of power output and exhaust temperature outputted from the performance computation module and the actual measured values of power output and exhaust temperature;
wherein the gas turbine performance analysis system further comprises:
an adjustment module for calculating a corrected value of the fuel flow rate based on the actual measured values of inlet air temperature, compressor pressure ratio and fuel flow rate, and inputting the corrected fuel flow rate value into the performance computation module;
wherein the adjustment module is further for executing a computation to correct the fuel flow rate value based on the actual measured values of inlet air temperature, compressor pressure ratio and fuel flow rate according to a predetermined functional relation, replacing the measured value of fuel flow rate with the corrected fuel flow rate value, and inputting the corrected fuel flow rate value into the performance computation module,
the performance computation module includes an adjustment function setting module for establishing the functional relation of the adjustment module so that a deviation between the values of power output and exhaust temperature, which were calculated by inputting a plurality of data sets including time-series data of a certain time period about the actual measured values of inlet air temperature, compressor pressure ratio, and fuel flow rate or data about a plurality of operating conditions, and the actual measured values is within a predetermined allowable range, and
the adjustment function setting module comprises:
a backward calculation module for revising fuel flow rate data of each data set so that the deviation between the computed values of power output and exhaust temperature, which are calculated and outputted by the performance computation module by using the data of each of a plurality of data sets, and the actual measured values is within predetermined upper and lower limits,
a data retention means for storing fuel flow rate data revised by the backward calculation module along with the data about inlet air temperature, compressor pressure ratio, and fuel flow rate of the corresponding data set, and
an adjustment function identification module for fitting the corrected fuel flow rate as a function of inlet air temperature, compressor pressure ratio, and fuel flow rate based on the corrected fuel flow rate, inlet air temperature, compressor pressure ratio, and fuel flow rate of a plurality of data sets stored in the data retention means.

2. A gas turbine performance analysis system comprising:
a performance computation module for receiving each of actual measured values of an inlet air temperature introduced to a compressor, a compressor pressure ratio and a fuel flow rate supplied to a gas turbine in the actual gas turbine, and calculating and outputting values the gas turbine's power output and exhaust temperature exhausted from the gas turbine based on these actual measured values; and
a performance estimation module for evaluating performance of the gas turbine based on a deviation between the values of power output and exhaust temperature outputted from the performance computation module and the actual measured values of power output and exhaust temperature;
wherein the gas turbine performance analysis system further comprises:
an adjustment module for calculating a corrected value of the fuel flow rate based on the actual measured value of inlet air temperature, the actual measured values of inlet air temperature and compressor pressure ratio, or the actual measured values of inlet air temperature and fuel flow rate, and inputting the corrected fuel flow rate value into the performance computation module;
wherein the adjustment module is further for executing a computation to correct the fuel flow rate value based on the actual measured value of inlet air temperature, the actual measured values of inlet air temperature and compressor pressure ratio, or the actual measured values of inlet air temperature and fuel flow rate according to a predetermined functional relation, replacing the measured value of fuel flow rate with the corrected fuel flow rate value, and inputting the corrected fuel flow rate value into the performance computation module,
the performance computation module includes an adjustment function setting module for establishing the functional relation of the adjustment module so that a deviation between the values of power output and exhaust temperature, which were calculated by inputting a plurality of data sets including time-series data of a certain time period about the actual measured values of inlet air temperature, inlet air temperature and compressor pressure ratio, or inlet air temperature and fuel flow rate, or data about a plurality of operating conditions, and the actual measured values is within a predetermined allowable range, and
the adjustment function setting module comprises
a backward calculation module for revising fuel flow rate data of each data set so that the deviation between the computed values of power output and exhaust temperature, which are calculated and outputted by the performance computation module by using the data of each of a plurality of data sets, and the actual measured values is within predetermined upper and lower limits, a data retention means for storing fuel flow rate data revised by the backward calculation module along with the data about inlet air temperature, compressor pressure ratio, and fuel flow rate of the corresponding data set, and an adjustment function identification module for fitting the corrected fuel flow rate as a function of inlet air temperature, compressor pressure ratio, and fuel flow rate based on the corrected fuel flow rate, inlet air temperature, compressor pressure ratio, and fuel flow rate of a plurality of data sets stored in the data retention means.

3. The gas turbine performance analysis system according to claim 2, wherein the adjustment module is further for calculating a computation to correct the fuel flow rate value based on the actual measured value of inlet air temperature, actual measured values of inlet air temperature and compressor pressure ratio, or actual measured values of inlet air temperature and fuel flow rate according to a predetermined functional relation, and inputting the corrected fuel flow rate value into the performance computation module.

* * * * *